US010899305B2

(12) United States Patent
Gwon et al.

(10) Patent No.: US 10,899,305 B2
(45) Date of Patent: Jan. 26, 2021

(54) AIRBAG FOR SIDE COLLISION

(71) Applicant: Autoliv Development AB, Vårgårda (SE)

(72) Inventors: Tae Ik Gwon, Gongju-Si (KR); Mats Berntsson, Gothenburg (SE); Par Sandinge, Alingsås (SE); Jong-Ki Byun, Seoul (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 337 days.

(21) Appl. No.: 15/776,230

(22) PCT Filed: Nov. 17, 2016

(86) PCT No.: PCT/KR2016/013257
§ 371 (c)(1),
(2) Date: May 15, 2018

(87) PCT Pub. No.: WO2017/086707
PCT Pub. Date: May 26, 2017

(65) Prior Publication Data
US 2020/0254961 A1 Aug. 13, 2020

(30) Foreign Application Priority Data
Nov. 19, 2015 (KR) .................. 10-2015-0162398

(51) Int. Cl.
B60R 21/231 (2011.01)
B60R 21/207 (2006.01)
(Continued)

(52) U.S. Cl.
CPC ...... B60R 21/23138 (2013.01); B60R 21/207 (2013.01); B60R 21/2338 (2013.01);
(Continued)

(58) Field of Classification Search
CPC .......... B60R 21/23138; B60R 21/2338; B60R 21/207; B60R 2021/23161;
(Continued)

(56) References Cited

U.S. PATENT DOCUMENTS 8,414,018 B2 4/2013 Choi et al.
8,474,863 B2 * 7/2013 Rick ................. B60R 21/23138
280/730.2
(Continued)

FOREIGN PATENT DOCUMENTS

JP 2014-015157 A 1/2014
JP 2015-189399 A 11/2015
(Continued)

OTHER PUBLICATIONS

International Search Report for PCT/KR2016/013257, ISA/KR, Daejeon, dated Feb. 23, 2017 with English translation.
(Continued)

Primary Examiner — Drew J Brown
(74) Attorney, Agent, or Firm — Harness, Dickey & Pierce, P.L.C.; Stephen T. Olson

(57) ABSTRACT

Provided is a side airbag for side collision which is deployed between two seats in a width direction of a vehicle to prevent occupants siting on the two seats from colliding with each other. The airbag includes a chest protective area to protect a chest of an occupant; a head protective area extending upward from the chest protective area to protect a head of the occupant; and a support area extending rearward from the head protective area and making contact with a head rest, which is provided on an upper portion of a back of the seat, so as to be supported by the head rest, wherein, the support area of the airbag is supported by the head rest when the vehicle collision occurs to prevent a head of an occupant who sits near a crashed side from moving rearward of the (Continued)

head protective area, thereby preventing the head of the occupant sitting near the crashed side from colliding with a head of a counterparty occupant who faces the occupant sitting near the crashed side in the width direction of the vehicle.

12 Claims, 6 Drawing Sheets

(51) Int. Cl.
 *B60R 21/2338* (2011.01)
 *B60R 21/00* (2006.01)
(52) U.S. Cl.
 CPC ............... *B60R 2021/0006* (2013.01); *B60R 2021/0044* (2013.01); *B60R 2021/0048* (2013.01); *B60R 2021/23146* (2013.01); *B60R 2021/23161* (2013.01)
(58) Field of Classification Search
 CPC .... B60R 2021/0044; B60R 2021/0006; B60R 2021/0048; B60R 2021/23146
 See application file for complete search history.

(56) References Cited

U.S. PATENT DOCUMENTS

| | | | |
|---|---|---|---|
| 8,702,122 B2* | 4/2014 | Tomitaka | B60R 21/23138 280/730.1 |
| 8,899,619 B2 | 12/2014 | Fukawatase | |
| 9,004,526 B2* | 4/2015 | Fukawatase | B60R 21/231 280/729 |
| 9,016,718 B2* | 4/2015 | Fukawatase | B60R 21/233 280/730.2 |
| 9,428,136 B2 | 8/2016 | Ishida et al. | |
| 2011/0074141 A1* | 3/2011 | Wipasuramonton | B60R 21/2342 280/736 |
| 2012/0119475 A1 | 5/2012 | Choi et al. | |
| 2013/0079208 A1* | 3/2013 | Wiik | B60R 21/237 493/405 |
| 2014/0015233 A1 | 1/2014 | Fukawatase | |
| 2015/0084315 A1 | 3/2015 | Acker et al. | |
| 2015/0197209 A1* | 7/2015 | Fujiwara | B60R 21/231 280/730.1 |
| 2015/0274110 A1* | 10/2015 | Ishida | B60R 21/01512 280/729 |
| 2015/0274111 A1 | 10/2015 | Ishida et al. | |
| 2015/0274113 A1* | 10/2015 | Nagasawa | B60R 21/207 280/730.2 |

FOREIGN PATENT DOCUMENTS

KR 2012-0051279 A 5/2012
KR 2013-0008337 A 1/2013

OTHER PUBLICATIONS

Written Opinion of the ISA for PCT/KR2016/013257, ISA/KR, Daejeon, dated Feb. 23, 2017.

* cited by examiner

AIRBAG FOR SIDE COLLISION

CROSS-REFERENCE TO RELATED APPLICATIONS

This application is a 371 U.S. National Stage of International Application No. PCT/KR2016/013257, filed Nov. 17, 2016, which claims priority to Korean Patent Application No. 10-2015-0162398, filed Nov. 19, 2015. The disclosures of the above applications are incorporated herein by reference.

TECHNICAL FIELD

The embodiment relates to an airbag for side collision, which is deployed between two seats in a width direction of a vehicle upon a vehicle collision.

BACKGROUND ART

Generally, an airbag for side collision for protecting an occupant upon a side collision of a vehicle has been known. The airbag for side collision includes a near side airbag which is inflated to be deployed between an occupant and a component such as a door of a vehicle such that an occupant is protected from the component of a vehicle protruding inwardly due to side collision impact, and a far side airbag which restricts an occupant to move inwardly due to reaction after a side collision.

Such a far side airbag is required to remain at a predetermined position in an expanded state in order to prevent occupants from colliding with each other, specifically, head-to-head collision.

DOCUMENT OF RELATED ART

Patent Document (Patent document 1) International Publication No. WO 2009/035114
(Patent document 2) Japanese Unexamined Patent Publication No. 2015-110373

DISCLOSURE

Technical Problem

It is an object of the disclosure to provide an airbag for side collision capable of preventing the head of an occupant near a crashed side from rotatably moving rearward of a head protective area of the airbag.

Technical Solution

To solve the problem, according to the embodiment, there is provided a side airbag for side collision, which is deployed between two seats in a width direction of a vehicle to prevent occupants siting on the two seats from colliding with each other, which includes: a chest protective area to protect a chest of an occupant; a head protective area extending upward from the chest protective area to protect a head of the occupant; and a support area extending rearward from the head protective area and making contact with a head rest, which is provided on an upper portion of a back of the seat, so as to be supported by the head rest, wherein, the support area of the airbag is supported by the head rest when the vehicle collision occurs to prevent a head of an occupant who sits near a crashed side from moving rearward of the head protective area, thereby preventing the head of the occupant sitting near the crashed side from colliding with a head of a counterparty occupant who faces the occupant sitting near the crashed side in the width direction of the vehicle.

The chest protective area, the head protective area and the support area are integrally formed, and the side airbag is deployed by a single inflator provided in the back of the seat.

The support area is larger than an area overlapping the head rest such that the support area is sufficiently supported on the head rest when impact is applied from the occupant.

A shoulder of the occupant is primarily restricted by a shoulder restricting part formed on the chest protective area when the vehicle collision occurs, and then the head of the occupant near the crashed side slides downwardly along an outer surface of the side airbag.

The side airbag is configured such that the head of the occupant near the crashed side slides downwardly along an outer surface of the side airbag.

An inflated thickness of the side airbag in the width direction of the vehicle is gradually narrowed from an upper portion of the side airbag to a lower portion of the side airbag.

The side airbag further includes a supplementary chamber area provided at a side of the support area facing the head rest and protruding toward the head rest.

The side airbag further includes a tether including one end connected to the support area and an opposite end connected to a portion near a portion connected to the inflator, wherein the tether reinforces a supporting strength of the side airbag when the side airbag is inflated.

Advantageous Effects

According to the airbag for side collision of the embodiment, when the air bag is inflated, the support area protruding rearward of the head protective area makes direct contact with the head rest of a vehicle to be supported, so that the head of an occupant who sits near a crashed side may be prevented from rotatably moving rearward of the head protective area of the airbag upon a vehicle collision, thereby preventing a head-to-head collision from occurring between the occupants.

BEST MODE

Mode for Invention

Figure 1:
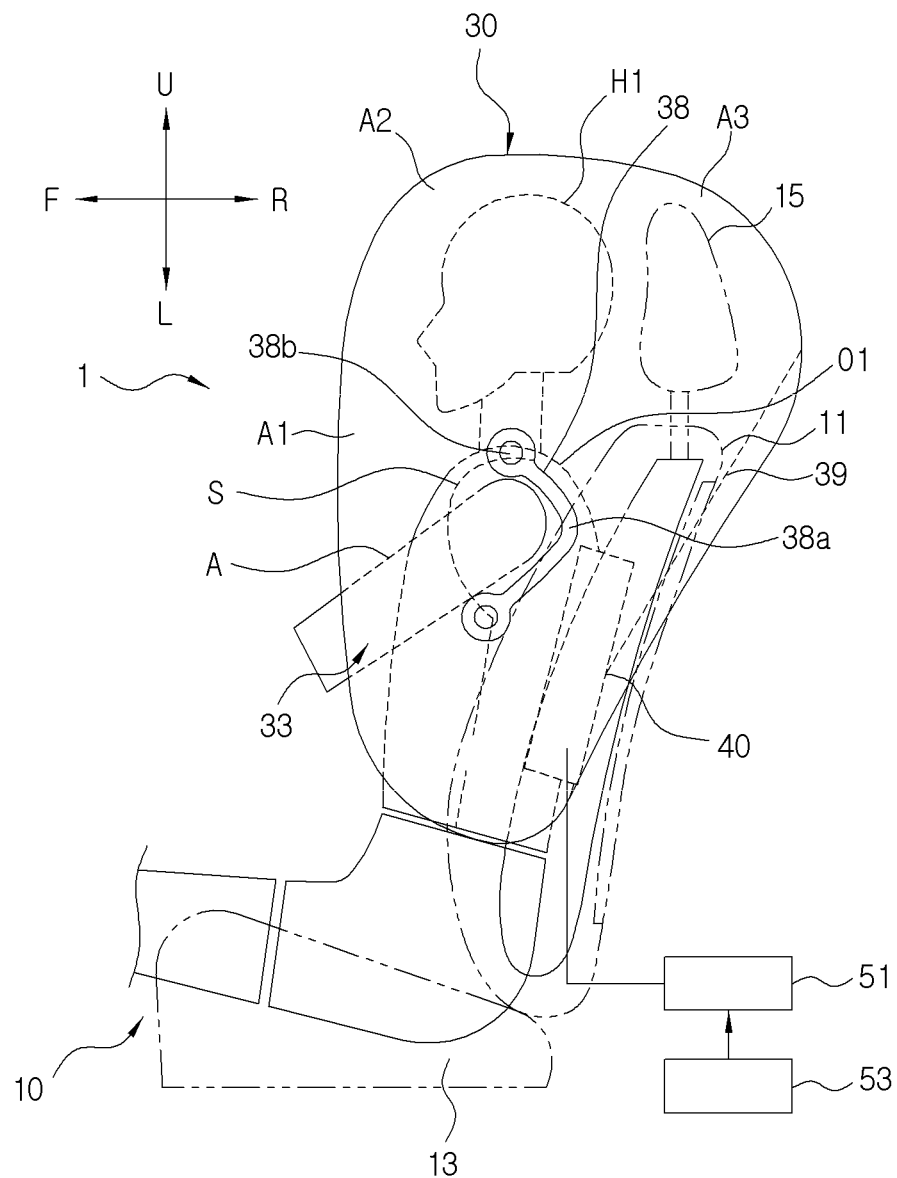
FIG. 1 is a side view showing a side airbag according to an embodiment.

Hereinafter, embodiments of the disclosure will be described in more detail with reference to accompanying drawings. The disclosure is not limited to the following embodiments but includes various applications and modifications. The embodiments will make the disclosure of the present invention complete, and allow those skilled in the art to completely comprehend the scope of the disclosure.

In the drawings, arrow F represents a front direction of a vehicle, arrow U represents an upper direction of a vehicle, and arrow I represents an inside of a vehicle in a width direction of the vehicle. In addition, two occupants are denoted as reference numerals O1 and O2, respectively.

Figure 2:
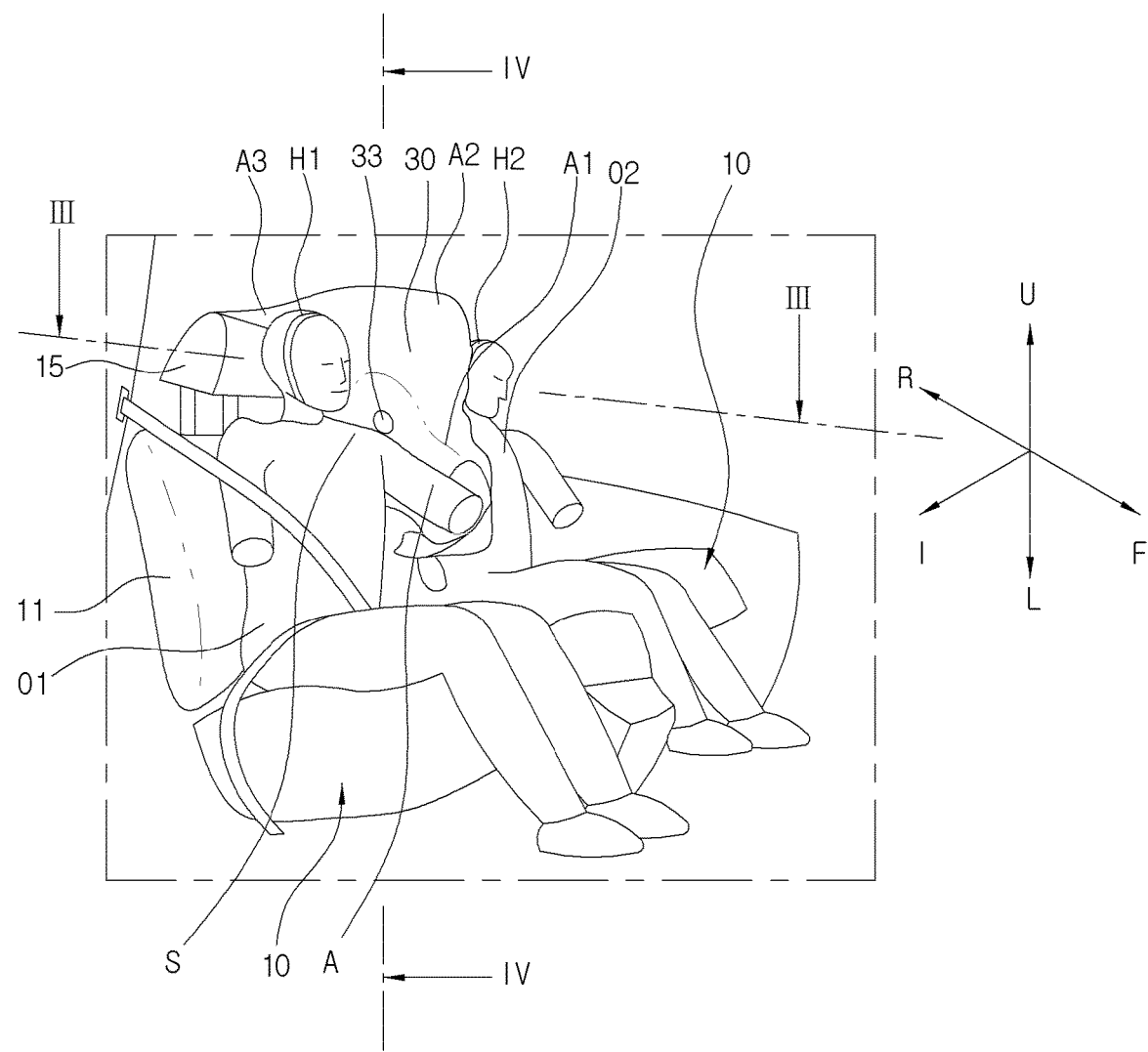
FIG. 2 is a side perspective view showing an inflated state of a side airbag according to an embodiment.

FIG. 1 is a side view showing a side airbag according to an embodiment. FIG. 2 is a side perspective view showing an inflated state of a side airbag according to an embodiment.

Referring to FIGS. 1 and 2, the airbag 1 is installed in a side portion of a seat bag 11 of a vehicle seat 10 toward an inside of a vehicle.

The seat back 11 of the vehicle seat 10 is connected to a rear end of a seat cushion. A head rest 15 is connected to an upper end of the seat back 13.

The airbag 30 is modularized with an inflator 40 and stored in a side portion of the seat back 11 in a folded state. The airbag 30 is inflated by the gas pressure generated from the single inflator 40 to be deployed between two occupants O1 and O2 (see FIG. 2) sitting in the width direction of a vehicle.

The inflator 40 is electrically connected to a control device 51 installed in a vehicle. A crash sensor 53 for sensing a side collision of the vehicle is connected to the control device 51. When the side collision of the vehicle is sensed based on a signal from the crash sensor 53, the control device 51 operates the inflator 40. In addition, when a free crash sensor for predicting a side collision is electrically connected to the control device 51, if the control device 51 determines the side collision based on the signal from the free crash sensor, the control device 51 may operate the inflator 40.

The airbag 30 includes a chest protective area A1 for protecting chests T of the occupants O1 and O2, a head protective area A2 for protecting the heads of the occupants O1 and O2, and a support area A3 which makes contact with the head rest 15 to be supported.

The support area A3 extends rearward of the head protective area A2 to make contact with the head rest 15 when the airbag 30 is inflated. The support area A3 has a size enough to cover the head rest 15, so that the support area A3 is sufficiently supported by the head rest 15 to prohibit the head H1 of the occupant O1 who sits near the crushed side of a vehicle from moving rearward of the head protective area A2 while the head H1 of the occupant O1 is rotated by the impact force applied to the occupant O1 when the vehicle collision occurs, thereby preventing the head H1 of the occupant O1 from colliding with the head of a counterparty occupant.

For example, the airbag 30 is formed of two pieces of polyester-based fabric which overlap each other and of which outer circumferences are sewed onto each other. The chest protective area A1, the head protective area A2 and the support area A3 are integrated with one another. According to another embodiment, after the chest protective area A1, the head protective area A2 and the support area A3 are separately formed, the chest protective area A1, the head protective area A2 and the support area A3 may be integrally connected to one another through sewing.

In this case, the airbag 30 is stored in a side of the seat back 11 in a folded state. When a vehicle collision occurs, the chest protective area A1 is first inflated with the gas generated from the inflator 40 to be deployed forward F of the vehicle. Then, the gas moves upwardly from the chest protective area A1 to be introduced into the head protective area A2 and the support area A3, so that the head protective area A2 and the support area A3 are rapidly inflated.

The chest protective area A1 of the airbag 30 includes a concave part 33 for receiving the shoulders S and arms A of the occupants O1 and O2. The concave part 300 is inclined forward and downwardly of the vehicle substantially corresponding gradients of the shoulders S and arms A of the occupants O1 and O2.

According to one embodiment, the concave part 33 may be formed by a seam line 38 having a substantial U-sharped part 38a and a circular-shaped part 38b formed on both ends of the U-sharped part 38a. According to another embodiment, the concave part 33 may be formed by an inner tether connected to both inner side surfaces of the airbag 10.

In this case, when a vehicle collision occurs, after the shoulder S or arm A of an occupant O1 is primarily restricted in the concave part 33, the head H1 of the occupant O1 slides downwardly from the head protective area A2 of the airbag 30. According to the airbag 30, the chest protective area A1 is primarily inflated with the gas generated from the single inflator 40 provided in the inner side surface of the seat back 11 to be deployed in the front direction of the vehicle. Then, the gas in the chest protective area A1 rises in an instant, so that the head protective area A2 and the support area A3 are inflated.

In this case, the support area A3 extends rearward from the head protective area A2 to overlap the head rest 15. The support area A3 makes contact with the head rest 15 to be supported when the airbag is inflated. Thus, when a vehicle collision occurs, the head H1 of an occupant O1 is prevented from rotatably moving rearward of the head protective area A2 so that the head H1 of an occupant O1 may not collide with the head H2 of a counterparty occupant O2.

It is preferable that the support area A3 has a size enough to cover the head rest 15, such that the support area A3 does not depart from the head rest 15 when the occupant O1 collides with the airbag upon a vehicle collision.

According to an embodiment, a tether 39 may be provided to reinforce the supporting strength of the airbag 30 when the airbag 30 is inflated. One end of the tether 39 is coupled to a portion near the inflator 40 and the opposite end of the tether 39 is connected to the support area A3, so that the support area 30 may be induced to suitably make contact with the head rest 15 when the airbag 30 is inflated. The tether 39 may be provided to an inside or outside of the airbag 30. When the tether 39 is provided to an outside of the airbag 30, the tether 39 is restricted by a link member which supports the tether 39 to enable the tether 39 to slide on an outer surface of the airbag 30, such that the tether 39 is prevented from interfering with the structures in the vehicle or the occupants when the airbag 30 is inflated.

FIGS. 1 and 2 show the airbag 30 protecting the chests and heads of occupants O1 and O2. However, the airbag may be configured in various forms. For example, the airbag may extend downwardly to protect the pelvis of an occupant.

Figure 3:
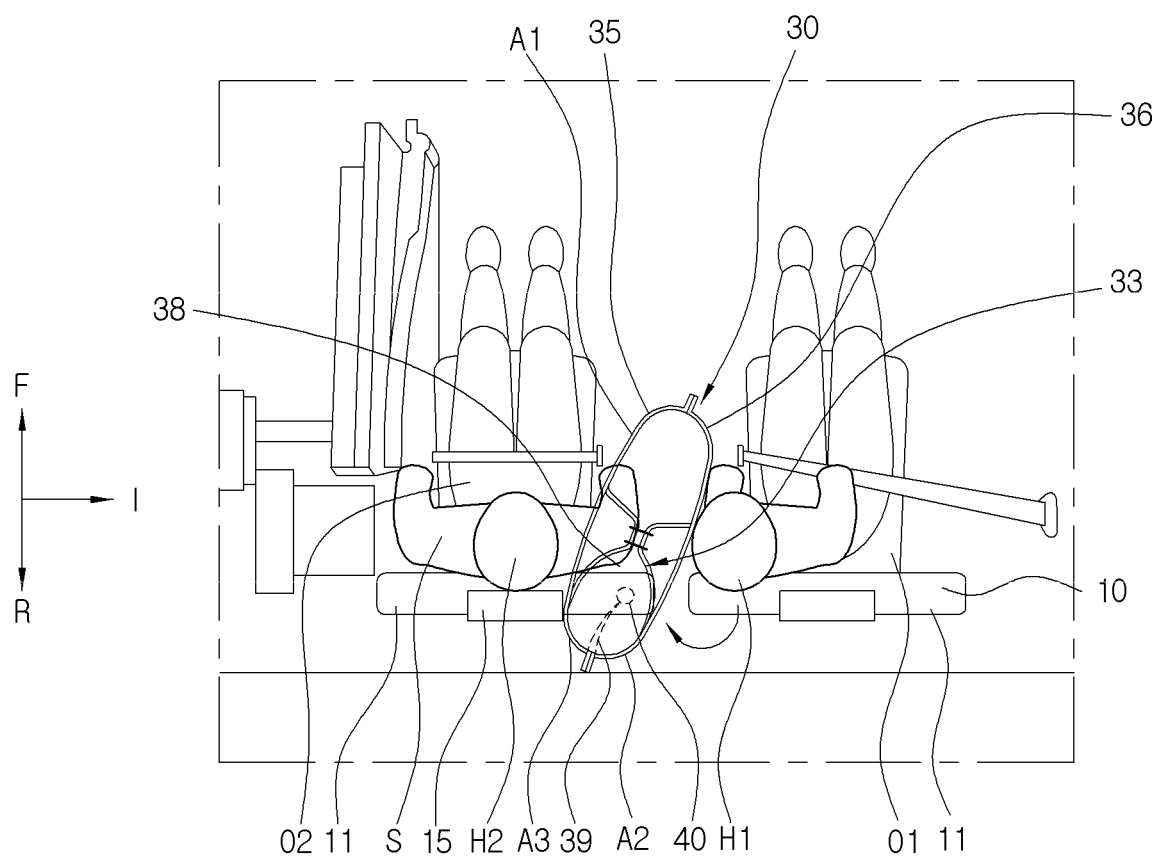
FIG. 3 is a cross-sectional view taken along line III-III of FIG. 2.
Figure 4:
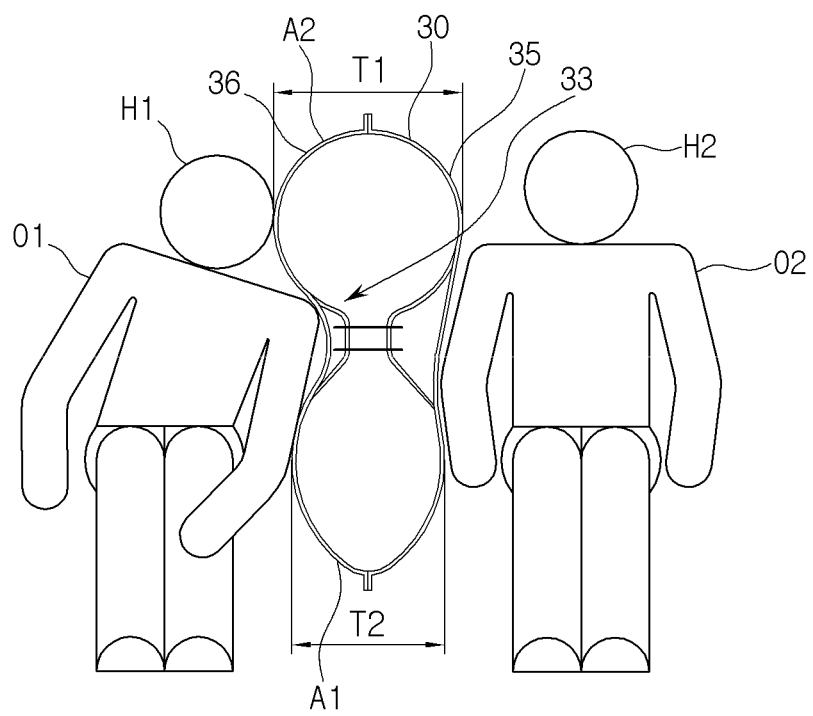
FIG. 4 is a longitudinal-sectional view taken along line IV-IV of FIG. 2.

FIG. 3 is a cross-sectional view taken along line III-III of FIG. 2. FIG. 4 is a longitudinal-sectional view taken along line IV-IV of FIG. 2. Hereinafter, the description will be made with regard to the state in which an occupant O1 in a passenger seat (right in the drawings) inertially moves toward an occupant O2 in a driver seat upon a vehicle collision.

Referring to FIGS. 3 and 4, the airbag 30 is deployed between two seats 10 arranged in a width direction of a vehicle when a vehicle collision occurs. The airbag 300 may be provided on at least one of the two seats 10. In the drawings, the airbag 30, which is inflated and deployed from the inner side surface of the seat back 13 of a left seat 10 based on the front direction F of a vehicle, is depicted.

In the side portion facing an inside of the vehicle, the chest protective area A1 of the airbag 10 is first inflated to be deployed in the front direction F of a vehicle and then, the head protective area A2 and the support area A3 are inflated and deployed in sequence.

When the airbag 30 is inflated, the support area A3 of the airbag 30 makes contact with the head rest 15 to be supported. When a vehicle collision occurs, the head H2 of an occupant O1 sitting at the crushed side may be rotated clockwise while making contact with the head protective area A2 of the airbag 30, and may move rearward of the head protective area A2. In this case, the support area A2 is sufficiently supported by the head rest 15 to restrict the head H1 of the occupant O1, so that the head H1 of the occupant O1 is prevented from colliding with the head H2 of a counterparty occupant O2.

The head H1 of the occupant O1 restricted by the support area A2 slides downwardly of the vehicle on the outer surface 36 of the airbag 30. In this case, an upper inflation thickness T1 of the airbag 30 in the width direction of a vehicle may be greater than a lower inflation thickness T2 of the airbag 30.

According another embodiment, the upper inflation thickness of the airbag 30 in the width direction of a vehicle may be gradually narrowed from an upper portion to a lower portion.

In the configuration described above, when the head H1 of the occupant O1 makes contact with the outer surface 36 of the airbag 30 upon a vehicle collision, the head H1 slides downwardly L of the airbag 30 so that the head H1 may be effectively prevented from colliding with the head H1 of the counterparty occupant O2.

Figure 5:
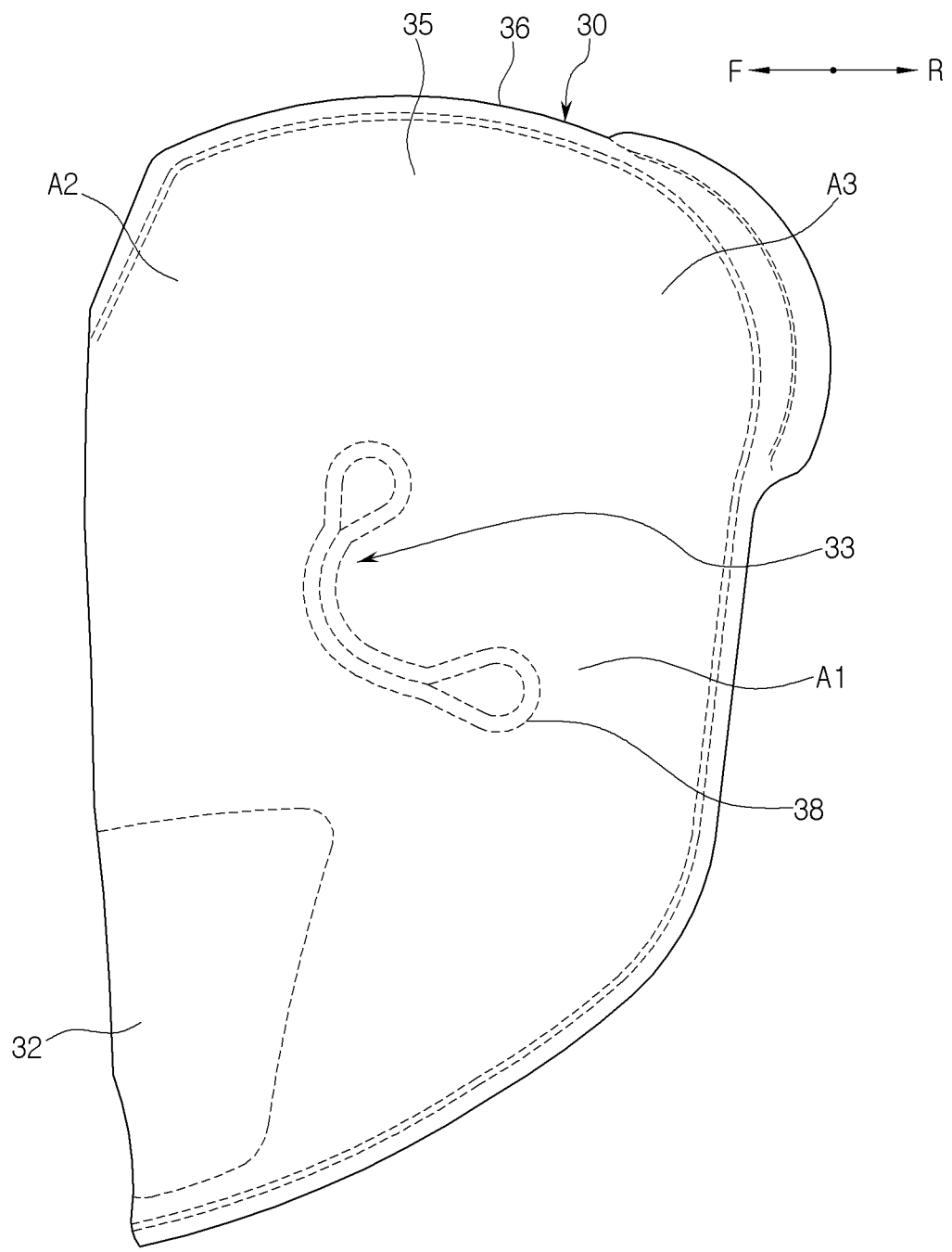
FIG. 5 is a view showing an uninflated state and a fully inflated state of a side airbag according to an embodiment.

FIG. 5 is a view showing an uninflated state and a fully inflated state of a side airbag according to an embodiment.

Referring to FIG. 5, the airbag 30 is formed to have a pocket shape by sewing outer edges of two sheets of fabric panels 35 and 36 overlapping each other.

The rear side of the airbag 30 is not sewed to remain in an opened state. Thus, an inflator connecting part 32 is placed in the seat back 11 of the seat 10 and connected to the inflator 40 (see FIG. 1), such that the gas generated from the inflator 40 is supplied into the airbag 30.

While the two fabric panels 35 and 36 overlap each other, substantially central portions of the two fabric panels 35 and 36 are sewed to form a seam line 38. When gas is supplied to the airbag 30 through the seam line 38 between the fabric panels 35 and 36 such that the airbag 30 is inflated, the concave part 33 is formed in the inflated airbag 30, so that the concave part 33 receives the shoulder S or arm A of the occupant O.

The airbag 30 includes the chest protective area A1, the head protective area A2 and the support area A3 to have a substantial D shape, and the support area A3 protrudes from the head protective area A2.

Figure 6:
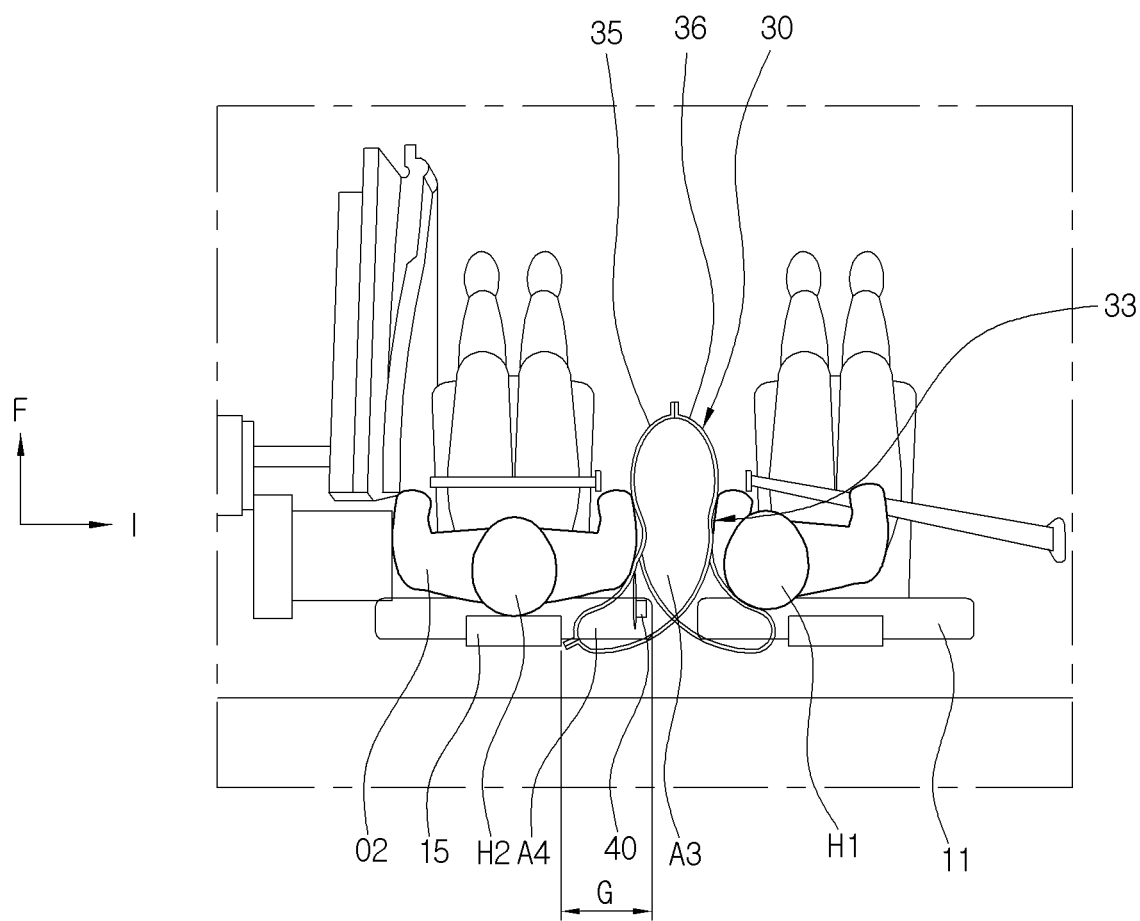
FIG. 6 is a cross-sectional view showing an inflated state of a side airbag according to another embodiment.

FIG. 6 is a cross-sectional view showing an inflated state of a side airbag according to another embodiment.

In the following description, the same elements will be assigned with the same reference numerals, and the repetition in the description of the same elements having the same reference numerals will be omitted.

Referring to FIG. 6, an additional chamber area A4 may be formed in the support area A3 of the airbag 30 in order to improve the contact ability with the head rest 15.

A length of the head rest 15 in the width direction of a vehicle is shorter than that of the back 11 of the seat 10 in the width direction of a vehicle. Thus, a step difference having a predetermined length G is formed between the seat back 11 and the head rest 15. The additional chamber area A4 is inflated corresponding to the step difference between the head rest 15 and the seat back 11, so that the support area A3 is effectively supported by the head rest 15, thereby improving the supporting strength of the airbag 30.

Hereinafter, an operation of the airbag according to an embodiment will be described.

Referring to FIGS. 1 to 5, when a vehicle collision occurs and the control device 51 determines the vehicle collision based on the signal from the crush sensor 53, the inflator 40 is operated by the control device 51. When the inflator 40 discharges gas into the airbag 30 in which the inflator 40 is stored, the chest protective area A1 of the airbag 30 is inflated to be deployed in the front direction F of the vehicle.

Thereafter, the gas in the chest protective area A1 rapidly rises into the head protective area A2 and the support area A3, so that the head protective area A2 and the support area A3 are rapidly inflated.

When the airbag 30 is inflated, the substantial central portion of the airbag 30 is restricted by the seam line 39 so that the concave part 33 is formed in the chest protective area A1.

Thus, while the shoulder S or arm of the occupant O1 moving toward an inside of the vehicle is primarily restricted to the concave part 33 on the fabric panel 36 of the airbag 30, the head H1 of the occupant O1 slides downwardly on the outer surface of the fabric panel 36 of the airbag 30.

When a vehicle collision occurs, the head H1 of the occupant O1 may substantially crash to the head protective area A2 and may be pushed rearward of the head protective area A2 while being rotated clockwise (arrow C of FIG. 3). In this case, the support area A3 is supported by the head rest 15 of the seat 10 while making contact with the head rest 15, so that the head H1 of the occupant O1 is prohibited from moving toward the head H2 of the counterparty occupant O2, thereby preventing the heads H1 and H2 of the occupants O1 and O2 from colliding with each other.

The weight of the occupant O1 inertially moved toward the center in the width direction of a vehicle due to the impact of a side collision is applied to the fabric panel 36 of the airbag 30. At this time, the shoulder S or arm A of the occupant O1 is primarily restricted by the concave part 33 formed in the airbag 30, so that the occupant O1 is prevented from moving.

Thus, the head H1 of the occupant O1 slides downwardly L on the outer surface of the fabric panel 36 of the airbag 30, so that the head H1 of the occupant O1 is prevented from colliding with the head H2 of the counterparty occupant O2. In this case, the inflation thickness T1 of an upper portion of the airbag 30 in the width direction of the vehicle may be less than the inflation thickness T2 of a lower portion of the airbag 30 in the width direction of the vehicle, so that the airbag 30 may be gradually narrowed from the upper portion of the airbag 30 to the lower portion of the airbag 30, thereby allowing the head H1 of the occupant O1 to smoothly move downwardly.

When the airbag 30 is inflated, the support area A3 is inflated and deployed in a size enough to cover the head rest 15, such that the support area A3 makes contact with and is supported by the head rest 15. As the result, since the supporting strength of the airbag 30 is excellent, the head H1 of the occupant O1 moves rearward of the head protective area A2, so that the head H1 of the occupant O1 is effectively prevented from colliding with the head H2 of the counterparty occupant O2.

Since the tether 39 is provided to a portion near the support area A3 and the inflator 40, when the airbag is inflated, the supporting strength of the airbag 30, specifically, the support area A3 is increased, so that the support area A3 may be suitably supported to the position of the head rest 15.

Referring to FIG. 6 together with the above-described operation, the additional inflation area A4 is inflated from both sides of the support area A3, so that the additional inflation area A4 is positioned at the step difference between the back 11 and the head rest 15 of the seat 10. As the result, the support area A3 of the airbag 30 may more effectively make contact with and supported by the head rest 15, so that the effect of restricting the head H1 of the occupant O1 may be increased.

In the above-described embodiment, the airbag apparatus 1 is provided to a seat (driver or passenger seat) of the first seat row of the vehicle, but the embodiment is not limited thereto. The airbag apparatus 1 may be applied to a seat of the second or third seat row of a vehicle.

Although an exemplary embodiment of the disclosure has been described for illustrative purposes, those skilled in the art will appreciate that various modifications, additions and substitutions are possible, without departing from the scope and spirit of the disclosure as disclosed in the accompanying claims.

The invention claimed is:

1. A side airbag in combination with a first seat of a vehicle, the first seat having a seat back and a head rest upwardly extending from the seat back, the side airbag comprising:
    a chest protective area to protect a chest of an occupant;
    a head protective area extending upward from the chest protective area to protect a head of the occupant; and
    a support area extending rearward from the head protective area and contacting the head rest of the first seat upon deployment of the side airbag such that the support area of the side airbag is directly supported in a lateral direction by the head rest, the lateral direction perpendicular to a forward direction of the vehicle,
    wherein the side airbag is stored in and deployable from a side portion of the seat back.

2. The side airbag of claim 1, wherein the chest protective area, the head protective area and the support area are integrally formed, and
    the side airbag is deployed by a single inflator provided in the seat back of the first seat.

3. The side airbag of claim 2, wherein the support area is larger than an area overlapping the head rest such that the support area is sufficiently supported on the head rest when impact is applied from the occupant.

4. The side airbag of claim 1, wherein a shoulder of the occupant is primarily restricted by a shoulder restricting part formed on the chest protective area when a collision occurs, and then the head of the occupant near a crashed side slides downwardly along an outer surface of the side airbag.

5. The side airbag of claim 1, wherein the side airbag is configured such that a head of the occupant near a crashed side slides downwardly along an outer surface of the side airbag.

6. The side airbag of claim 5, wherein an inflated thickness of the side airbag in a width direction of the vehicle is gradually narrowed from an upper portion of the side airbag to a lower portion of the side airbag.

7. The side airbag of claim 1, further comprising a supplementary chamber area provided at a side of the support area facing the head rest and protruding toward the head rest.

8. The side airbag of claim 1, further comprising a tether including one end connected to the support area and an opposite end connected to a portion near a portion connected to an inflator, wherein the tether reinforces a supporting strength of the side airbag when the side airbag is inflated and maintains a position of the support area that overlaps the head rest in the lateral direction.

9. The side airbag of claim 1, wherein the side airbag is configured for deployment between the first seat and a second seat of the vehicle to prevent occupants sitting on the first seat and a laterally adjacent second seat from colliding with each other.

10. The side airbag of claim 1, wherein the side airbag completely overlaps an upper portion of the seat back and the head rest in the lateral direction.

11. The side airbag of claim 1, wherein an upper portion of the side airbag including the support area and the head protection area has a cross-sectional shape in a horizontal plane with a major axis and a minor axis, the minor axis extending at an angle relative to the forward direction of the vehicle such that the support area contacts the side airbag upon deployment inflation of the side airbag and the upper portion of the side airbag extends laterally away from seat as it projects in the forward direction of the vehicle.

12. A side airbag in combination with a seat of a vehicle, the seat having a seat back and a head rest upwardly extending from the seat back, the side airbag comprising:
    a chest protective area to protect a chest of an occupant;
    an upper portion upwardly extending from the chest protective area, the upper portion including a head protective area and a support area rearwardly extending from the head protective area, the support area directly contacting the head rest of the seat upon deployment of the side airbag such that the support area of the side airbag is directly supported in a lateral direction perpendicular to a forward direction of the vehicle by the head rest, the upper portion having cross-sectional shape in a horizontal plane with a major axis and a minor axis, the minor axis extending at an acute angle relative to the forward direction of the vehicle,
    wherein the side airbag is stored in and deployable from a side portion of the seat back.

* * * * *